(No Model.)
B. C. MOLLOY.
METHOD AND APPARATUS EMPLOYED IN EXTRACTING GOLD AND SILVER FROM THEIR ORES AND IN FORMING AMALGAMS.
No. 290,259. Patented Dec. 18, 1883.
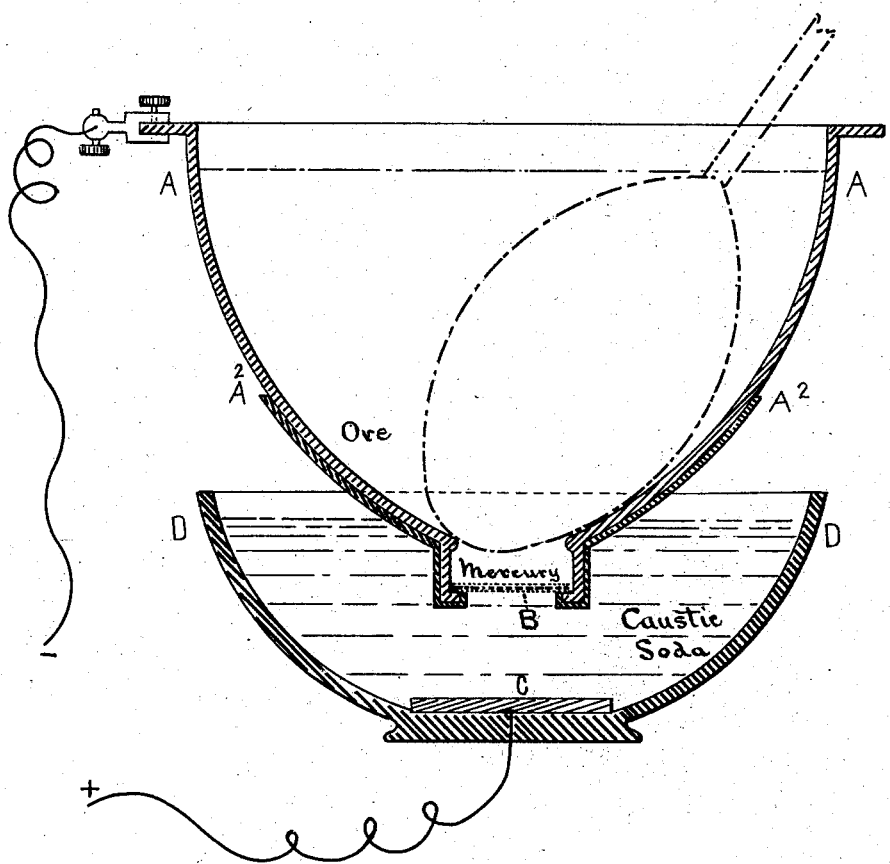
WITNESSES.
Chas R Abell
INVENTOR.
Bernard Charles Molloy,
by John J. Halsted & Son
his attys.

United States Patent Office.

BERNARD CHARLES MOLLOY, OF LONDON, ENGLAND.

METHOD AND APPARATUS EMPLOYED IN EXTRACTING GOLD AND SILVER FROM THEIR ORES AND IN FORMING AMALGAMS.

SPECIFICATION forming part of Letters Patent No. 290,259, dated December 18, 1883.

Application filed January 26, 1883. (No model.)

*To all whom it may concern:*

Be it known that I, BERNARD CHARLES MOLLOY, subject of the Queen of Great Britain and Ireland, residing at Elm Court Temple, in the city of London, England, barrister at law, have invented new and useful Improvements in Methods and Apparatus Employed in Extracting Gold and Silver from their Ores and in Forming Amalgams; and I do hereby declare the following to be a full, clear, and exact description of the invention, such as will enable others skilled in the art to which it appertains to make and use the same, reference being had to the accompanying drawing, and to the letters or figures marked thereon, which form a part of this specification.

My invention relates to an improved method of producing and applying amalgams of potassium, sodium, hydrogen, or other electro-positive elements to the extraction of gold and silver from their ores, and apparatus used therein.

For the purposes of my invention, I make use of a solution which will, under the action of electrolysis, produce the metal required for the purpose of making the desired amalgam. In effecting this purpose I seek a method which shall, as far as possible, be applicable to the various forms of apparatus now in use for the treatment of auriferous and argentiferous ores.

In order to explain my process, I will take, as an example, one form of pan known as the "Britten Pan."

A A is an iron pan, shaped as shown in the drawing. The dotted lines merely indicate the pear-shaped crusher used therein. In the bottom of the cup of the pan A A, I make an aperture, leaving a ledge, as indicated, which aperture is closed with a porous plate, (or other suitable porous diaphragm,) B, the bottom of the crusher being so arranged as that the crusher shall not, while revolving or otherwise, come into contact with the porous plate B. Outside of the pan A A, I place a vessel, D D, separated, preferably, an inch or more from the exterior of the pan A A. In some cases a portion of the pan A A may be employed as the separate vessel to contain the external solution, the separation being made by the porous diaphragm, proper precautions of course being taken to effect the necessary insulation; or the porous diaphragm may in some cases be constituted by a porous jar outside of the cup, with an aperture to such cup, and containing the mercury to be employed in the process. This vessel D D may be constructed of wood saturated with paraffine, of glazed earthenware, porcelain, or other suitable material. At the bottom of this vessel D D, I place a plate of carbon, silver, or other anode, non-oxidizable or otherwise, which is put in contact with the copper or positive pole of the battery or other source of electricity, in manner indicated in drawing, or other convenient way. The lower surface of the pan A A is coated externally with an insulating material (to a height above the level of the solution in D D)—such as marine glue, gutta-percha, india-rubber, or other suitable material—so that there may be no direct metallic contact between the solution in the vessel D D, or the separated portion of the pan serving for the same purpose, and the metal pan A A. The coating of insulating material may be laid on from, say, $A^2$ to $A^2$, as shown in drawing.

In the vessel D D, or its equivalent, I place in the case of a sodium amalgam a solution of caustic soda or a salt of sodium in quantity sufficient for the work to be done. In the pan A A is placed the ore, which is there treated in the usual manner. A portion of the interior surface of the pan A A is preferably in contact with the mercury in the cup at B, so that the passage of electric current is from the positive pole of the source of electricity to the anode C, then through the electrolyte to the mercury, the lower surface of which constitutes the cathode, and thence through the substance of the metal pan A A to the negative pole of the source. If preferred, or when the material of the pan A A (or other vessel) is not a simple conductor, the negative pole of the source of electricity may be brought directly into contact with the mercury by means of an insulated wire.

The electrolyte in the vessel D D is decomposed by the current of electricity, with the result that sodium and hydrogen are liberated at the lower surface of the mercury, and constitute, with this metal, a true amalgam. This supply of sodium and hydrogen and the consequent production of sodium amalgam is continuous so long as the current passes. The resulting rapid evolution of hydrogen from the mercury maintains the latter in a clean fluid metallic condition, prevents oxidation of the mercury, and "flowing" and "sickening." Under these conditions the extraction of gold and silver from their ores is rendered more effective. When the operation is completed, the vessel D D may be removed and the amalgam drawn off by any suitable arrangement—say a stoneware tap fixed to the cup containing the mercury, and just above the level of the diaphragm B.

The minimum electro-motive force requisite to work the apparatus should not be less than four volts—say two Fitzgerald and Molloy cells; but it is generally advantageous to use a higher electro-motive force—as, for instance, six or eight volts—whatever the source of electricity may be. Two Fitzgerald and Molloy cells (four volts) will evolve hydrogen freely from the surface of the mercury cathode, such evolved hydrogen being the excess of the quantity required to produce the hydrogen amalgam. A small quantity of alkaline metal will also be separated. An amalgam of sodium and mercury containing a very small percentage of the former metal would, when used as a positive element in conjunction with a carbon negative and an aqueous electrolyte, give an electro-motive force of less than four volts. Such an amalgam could therefore, as will be understood, be obtained by means of an electro-motive force of four volts. If a number of these devices be connected in series—that is to say, the carbon or silver of one apparatus to the metal pan or insulated wire in contact with the mercury of the next apparatus—then the electro-motive force corresponding to one apparatus or to any number of apparatus in multiple arc requires to be multiplied by the number of devices so arranged in series. Thus with ten a minimum electro-motive force of forty volts should be used. If potassium amalgam be desired, then the electrolyte should be constituted by a solution of caustic potash or any suitable salt of potassium. The electrolyte, however, may be constituted by a solution of any metal electro-positive to hydrogen. When a "hydrogen amalgam," as I term it, is desired, then the electrolyte in D D may be simply a dilute acid, such as $H_2SO_4 + 10H_2O$—that is, concentrated oil of vitriol diluted with ten times its weight of water.

It will be seen that flow of water and other general action in the pan A A (and similarly in other apparatus) is not interfered with, and that the highly conducting solution employed as the electrolyte, being separated from the fluid in the amalgamating-pan by the porous diaphragm, is preserved from useless waste.

I have found in a course of experimental researches that in attempting to obtain an amalgam of sodium or any other metal electro-positive to hydrogen by the decomposition of an aqueous solution of a salt or an alkali, the amalgam of hydrogen is always, in the first instance, obtained whatever the percentage of the metal electro-positive to hydrogen which ultimately enters into combination with the mercury cathode.

It will be understood that I do not claim as new the mere decomposition of alkaline metals and earths by electricity in the presence of mercury, this being well known.

As described in this specification, the whole apparatus will be external to the amalgamating-pans whatever their shape or form, and can be easily and cheaply applied and adapted either underneath or at the side of such pans. The electrolyte used under these conditions may be very small in quantity, and will not be subject to waste, and the whole apparatus need not in any manner interfere with the ordinary character or working of the amalgamating-pans.

Having thus described and particularly ascertained the nature of my said invention and the manner in which the same is or may be used or carried into effect, what I claim as my invention is—

1. In separating metals from ores by means of mercury, the process of forming amalgams of the alkaline metals or earths, and therewith amalgamating the precious metals, which consists in decomposing a solution of caustic alkali in the presence of mercury by means of electricity, and simultaneously bringing the pulverized ore in contact with the amalgam thus produced, as herein described.

2. The combination of an amalgamating-vessel, A, provided with insulating coating $A^2$, a porous diaphragm, B, a pan, D, and electrical conductors, all as and for the purpose described.

In testimony whereof I affix my signature in presence of two witnesses.

BERNARD CHARLES MOLLOY.

Witnesses:
FREDERICK FORESTER GOOLD,
FREDK. JOHN LIPSHAM.